United States Patent [19]

Yamada et al.

[11] 4,023,056

[45] May 10, 1977

[54] COLLISION DETECTING SYSTEM

[75] Inventors: Takashi Yamada, Anjo; Kazuo Oishi, Oobu, both of Japan

[73] Assignee: Nippon Soken, Inc., Nisnio, Japan

[22] Filed: Feb. 12, 1976

[21] Appl. No.: 657,640

Related U.S. Application Data

[63] Continuation of Ser. No. 511,693, Oct. 3, 1974, abandoned.

[30] Foreign Application Priority Data

Nov. 30, 1973 Japan .............................. 48-135105

[52] U.S. Cl. .................................. 310/15; 310/30; 73/517 AV
[51] Int. Cl.² ........................................ H02K 35/00
[58] Field of Search ............. 310/15, 30; 73/517 R, 73/517 AV; 335/277

[56] References Cited

UNITED STATES PATENTS

| | | | |
|---|---|---|---|
| 3,024,374 | 3/1962 | Stauder | 310/15 |
| 3,768,832 | 10/1973 | Schmidt | 73/517 AV |
| 3,943,390 | 3/1976 | Ochiai | 310/15 |

Primary Examiner—Donovan F. Duggan
Attorney, Agent, or Firm—Cushman, Darby & Cushman

[57] ABSTRACT

A collision detecting system is mounted on the front part of an automobile to detect collisions thereof and comprises a permanent magnet, a generating coil and a plunger as its principal component elements. In the system, the plunger in bar form is composed of a magnetic material and it is extended through and displaced within a space which is defined by the cylindrical permanent magnet and disk pole pieces provided at each end of the permanent magnet and having central openings, and the generating coil is mounted in the space to provide a magnetic circuit along with the plunger and the permanent magnet.

6 Claims, 4 Drawing Figures

COLLISION DETECTING SYSTEM

This is a continuation, of application Ser. No. 511,693 filed Oct. 3, 1974, now abandoned.

BACKGROUND OF THE INVENTION

1. Field of the Invention

The present invention relates to a collision detecting system which is mounted on an automobile to detect collisions of the automobile upon occurrence thereof.

2. Description of the Prior Art

Collision detecting systems are known in the art in which in response to a collision of an automobile, a permanent magnet and a generating coil are displaced relative to each other and the collision is detected by means of a voltage induced in the generating coil in accordance with the time change of the magnetic flux passing through the generating coil. A disadvantage of this type of collision detecting system is that either the permanent magnet or the generating coil must be connected to a plunger adapted to be displaced upon collision of the automobile so as to ensure the relative displacement between the permanent magnet and the generating coil, with the result that a complicated connection is required between the plunger and either the generating coil or the permanent magnet, and the system tends to be operated erroneously by the vibration of the automobile and other extraneous causes.

SUMMARY OF THE INVENTION

It is the object of the present invention to provide a collision detecting system which overcomes the foregoing difficulty.

The system according to the present invention has among its great advantages the fact that realizing the magnetizaton of a magnetic material lags behind a rapidly varying magnetic field, a plunger adapted to be displaced under deceleration is composed of a magnetic material, and the plunger is disposed within a magnetic field produced by a permanent magnet so that it is displaced relative to the permanent magnet and a generating coil, whereby collisions of an automobile may be detected with a predetermined magnetic circuit being maintained at all times, and moreover the manufacture of the system is simplified due to the absence of any connection between the plunger and the permanent magnet or the generating coil, and the system is prevented from being operated erroneously by the vibration of the automobile and other extraneous causes.

DESCRIPTION OF THE PREFERRED EMBODIMENTS

Figure 1:
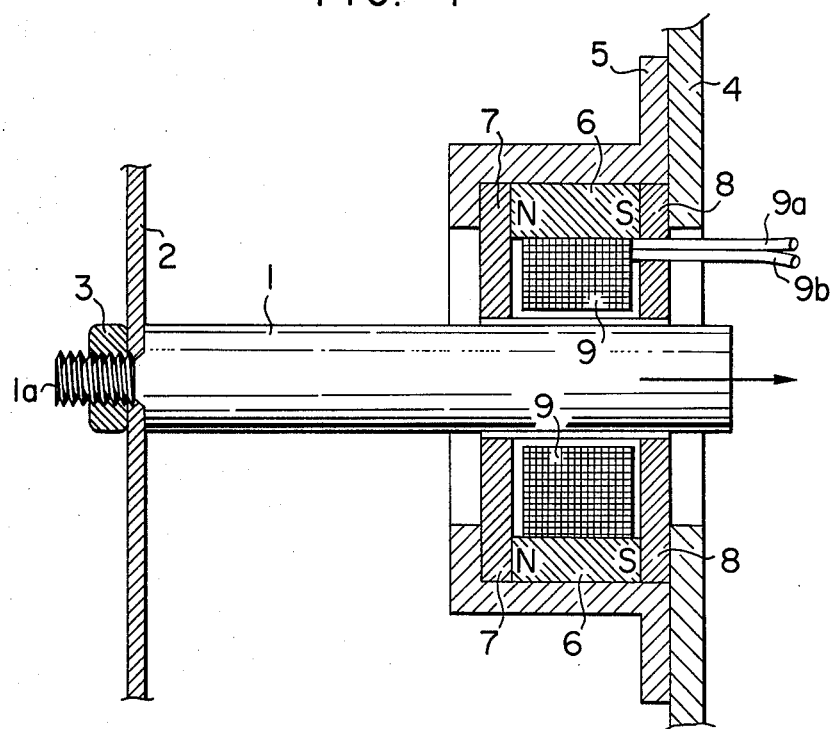
FIG. 1 is a sectional view of an embodiment of a collision detecting system according to the present invention.
Figure 2:
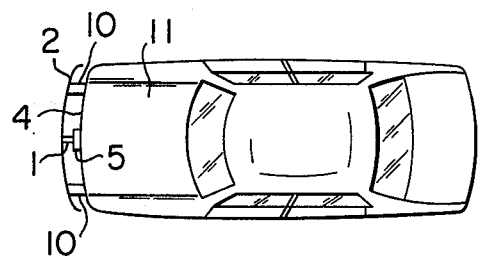
FIG. 2 is a schematic view showing the manner in which the system of this invention is installed on an automobile.
Figure 3:
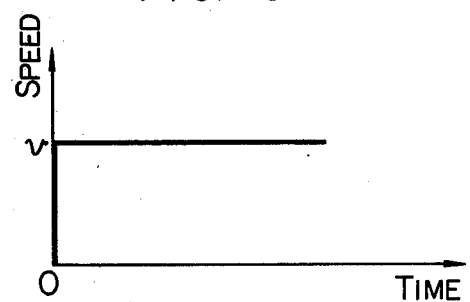
FIG. 3 is a time-speed characteristic diagram of the system of this invention.
Figure 4:
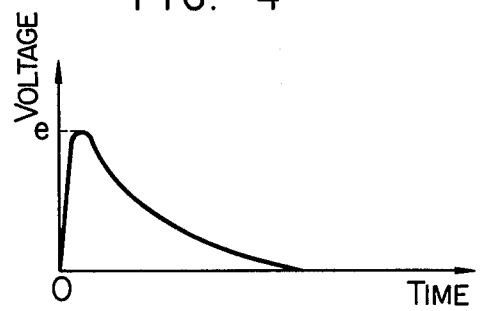
FIG. 4 is a time-voltage characteristic diagram of the system of this invention.

A preferred embodiment of the invention will now be described with reference to FIGS. 1 and 2, in which numeral 1 designates a plunger having a threaded portion 1a and composed of a magnetic material with a uniform shape in section, and the plunger 1 is securely attached to a bumper 2 by means of the threaded portion 1a and a nut 3. A cylindrical permanent magnet 6 which is axially magnetized, is disposed in a case 5 composed of a non-magnetic material and securely mounted on a body front part 4 of an automobile, and disk pole pieces 7 and 8 each having a central opening are pressed against the ends of the permanent magnet 6. A generating coil 9 having coil ends 9a and 9b is disposed in an internal space defined by the permanent magnet 6 and the pole pieces 7 and 8, and the portion of the plunger 1 which is opposite to the threaded portion 1a is extended through the central openings of the pole pieces 7 and 8 and through the generating coil 9 to permit the displacement of the plunger 1 along the central axis of the permanent magnet 6. As shown in FIG. 2, the bumper 2 is attached by bumper supports 10 to a vehicle body 11 so that the plunger 1 is not displaced relative to the permanent magnet 6 and the generating coil 9 except in the event of a collision of the automobile. A magnetic circuit is formed by the permanent magnet 6, the pole pieces 7 and 8 and the portion of the plunger 1 located between the pole pieces 7 and 8, and the magnetic flux produced by the permanent magnet 6 passes through the generating coil 9 through the portion of the plunger 1 located between the pole pieces 7 and 8.

With the construction described above, the operation of the collision detecting system of this invention will now be described with reference to FIGS. 1 through 4. When the automobile comes into collision with another automobile or an obstacle, in FIG. 1, a relative displacement occurs between the vehicle body front portion 4 and the bumper 2, and the plunger 1 fastened to the bumper 2 is subjected to a deceleration due to the collision. As a result, the plunger 1 is displaced in the direction of the arrow shown in FIG. 1 relative to the permanent magnet 6, the pole pieces 7 and 8 and the generating coil 9 secured to the vehicle body front part 4 by the case 5. When this occurs, the portion of the plunger 1 which was previously located between the pole pieces 7 and 8 thus forming a part of the magnetic circuit before the collision no longer constitutes any part of the magnetic circuit, and that portion of the plunger 1 which is displaced by the collision to be newly located between the pole pieces 7 and 8 now constitutes a part of the same magnetic circuit. In this case, due to the property of the magnetic material constituting the plunger 1, variation of the magnetic field produces in the magnetic material an eddy current tending to prevent the variation of the magnetic field and the variation of the magnetic flux is also slowed down. Thus, the follow-up characteristic of its magnetization is particularly poor when there is a rapid variation of the field such as a high frequency AC field. Consequently, the portion of the plunger 1 which is newly located between the pole pieces 7 and 8 after the collision due to rapid displacement of the plunger 1 is not immediately magnetized and the magnetic flux passing through the plunger 1 decreases. As a result, a voltage is induced acros the coil ends 9a and 9b of the generating coil 9. Consequently, the system of this invention detects the collision and the voltage signal is applied to an occupant protective system (not shown) which in turn comes into operation. In other words, when the plunger 1 is displaced with the step velocity $v$ shown in FIG. 3 under the deceleration due to the collision, the induced voltage having the peak value $e$ shown in FIG. 4 and corresponding to the velocity of the plunger 1 is generated across the coil ends 9a and 9b of the generating coil 9. With the system of this invention, when the magnetic flux passing through the plunger 1 was $2 \times 10^{-5}$ $(wb)$, the number of turns in the generating coil 9 was 200 (T) and the plunger 1 was displaced at the velocity $v = 5$ (m/s), the induced voltage having the peak value $l = 2(V)$ was generated in the generating coil 9 and it was confirmed that this induced voltage was sufficient as the signal voltage for actuating the occupant protective system. It will thus be seen that the generating coil 9 provides an induced voltage only in collisions of such magnitudes that require the actuation of the occupant protecting system, and no induced voltage is caused by the vibration of the automobile and other extraneous causes thus preventing any erroneous operation of the system.

Further, while, in the embodiment of the invention described above, the generating coil 9 is disposed between the pole pieces 7 and 8, the objects of the present invention can be satisfactorily achieved by using a bar or horseshoe type permanent magnet and disposing the generating coil 9 to enclose the magnet.

What is claimed is:

1. A collison detecting system of a vehicle so as to detect a collision and trigger an occupant protective system comprising:
   a permanent magnet having a cylindrical form and magnetized in an axial direction;
   a pair of disk pole pieces of magnetic material each having a central opening and pressed against the end portion of said permanent magnet;
   a cylindrical case member of non-magnetic material enclosing said permanent magnet and said pair of disk pole pieces which are disposed in substantially coaxial relation therewith said case being mounted to the body of the vehicle;
   a single generating coil having a cylindrical form and fixedly mounted in an internal space defined by said permanent magnet and said pair of disk pole pieces, said generating coil having coil ends which are electrically connected with an occupant protective system;
   a plunger composed of a magnetic material and having a uniform shape in section;
   wherein said plunger is slidably mounted through the central opening of said disk pole pieces so as to be movable between an initial position and a position following collision in response to a deceleration due to a collision, said plunger having first and second portions, said first portion being located to constitute a magnetic circuit together with said permanent magnet and said disk pole pieces and said second portion being located outside said magnetic circuit when said plunger is in said initial position and wherein said second portion is movable into the magnetic circuit and said first portion is movable out of said magnetic circuit when said plunger is moved to said position following collision whereby the dimensions and material in said magnetic circuit is maintained substantially constant so that the change in flux resulting from a change in the portion of said plunger positioned within said magnetic circuit in response to a collision produces an induced voltage in said generating coil.

2. A collision detecting system of a vehicle so as to detect a collision and trigger an occupant protective system comprising:
   a permanent magnet;
   a case member of non-magnetic material enclosing said permanent magnet, said case being mounted to a body of the vehicle;
   a generating coil having a cylindrical form and fixedly mounted within said case member, said generating coil having coil ends for electrical connection to an occupant protective system;
   a plunger composed of a magnetic material and having a uniform shape in section, said plunger being slidably mounted in said case to form with said magnet a magnetic circuit;
   wherein said plunger is slidably mounted so as to be movable with respect to said coil between an initial position and a position following collision in response to a deceleration due to a collision, said plunger having first and second portions, said first portion being located within the magnetic circuit established by said permanent magnet and said second portion being located outside the magnetic circuit when said plunger is in said initial position and wherein said second portion is movable into the magnetic circuit, and said first portion is movable out of said magnetic circuit when said plunger is moved to said position following collision whereby the dimensions and material in said magnetic circuit is maintained substantially constant so that the change in flux resulting from a change in the portion of said plunger positioned within said magnetic circuit in response to a collision produces an induced voltage in said generating coil.

3. A collision detecting system attached between the bumper and body of a vehicle so as to detect a collision and trigger an occupant protective system comprising:
   a permanent magnet having a cylindrical form and magnetized in an axial direction;
   a cylindrical case member of non-magnetic material enclosing said permanent magnet, said case being mounted to said body of the vehicle;
   a generating coil having a cylindrical form and fixedly mounted within said case member, said generating coil having coil ends for electrical connection to an occupant protective system;
   a plunger composed of a magnetic material and having a uniform shape in section, said plunger having a threaded portion at one end thereof for attachment to said bumper of the vehicle; and being slidably mounted in said case to produce with said magnet a magnetic circuit
   wherein said plunger is slidably mounted so as to be moveable with respect to said coil between an initial position and a position following collision in response to a deceleration due to a collision, said plunger having first and second portions, and first portion being located within the magnetic circuit established by said permanent magnet and said second portion being located outside the magnetic circuit when said plunger is in said initial position and wherein said second portion is moveable into the magnetic circuit, and said first portion is moveable out of said magnetic circuit when said plunger is moved to said position following collision whereby the dimensions and material in said magnetic circuit is maintained substantially constant so that the change in flux resulting from a change in the portion of said plunger positioned within said magnetic circuit in response to a collision produces an induced voltage in said generating coil.

4. A collision detecting system according to claim 3 wherein said plunger is sufficiently longer than said first portion so that the magnetic flux is not varied statically in accordance with movement of said plunger between said initial position and said position following collision.

5. A collision detecting system attached to the bumper of a vehicle so as to detect a collision and trigger an occupant protective system comprising:
   a permanent magnet having a cylindrical form and magnetized in an axial direction;
   a pair of disk pole pieces of magnetic material each having a central opening and pressed against the end portion of said permanent magnet;
   a cylindrical case member of non-magnetic material enclosing said permanent magnet and said pair of disk pole pieces which are disposed in substantially coaxial relation therewith said case being mounted to the body of the vehicle;
   a single generating coil having a cylindrical form and fixedly mounted in an internal space defined by said permanent magnet and said pair of disk pole pieces, said generating coil having coil ends which are electrically connected with an occupant protective system;
   a plunger composed of a magnetic material and having a uniform shape in section, said plunger having a threaded portion at one end thereof to securely attach said plunger to a bumper of the vehicle;
   wherein said plunger is slidably mounted so as to be moveable between an initial position and a position following collision in response to a deceleration due to a collision, said plunger having first and second portions, said first portion being located within the magnetic circuit established by said permanent magnet and said second portion being located outside the magnetic circuit when said plunger is in said initial position and wherein said second portion is moveable into the magnetic circuit and said first portion is moveable out of said magnetic circuit when said plunger is moved to said position following collision whereby the dimensions and material in said magnetic circuit is maintained substantially constant so that the change in flux resulting from a change in the portion of said plunger positioned within said magnetic circuit in response to a collision produces an induced voltage in said generating coil.

6. A collision detecting system according to claim 5 wherein said plunger is provided with a portion thereof which constitutes a magnetic circuit together with said permanent magnet and said pair of disk pole pieces, said plunger being provided with a length sufficiently longer than that of the portion and limited movement of said plunger in an axial direction, whereby the magnetic flux is not varied statically in accordance with the movement of said plunger.

* * * * *